(12) United States Patent
Langeland

(10) Patent No.: US 7,448,414 B2
(45) Date of Patent: Nov. 11, 2008

(54) HINGED AND SEGMENTED PIPE

(76) Inventor: Bjarte Langeland, Nedre Clav Nilssonsgate 3, Stavanger (NO) N-4009

(*) Notice: Subject to any disclaimer, the term of this patent is extended or adjusted under 35 U.S.C. 154(b) by 295 days.

(21) Appl. No.: 10/550,106

(22) PCT Filed: Mar. 18, 2004

(86) PCT No.: PCT/NO2004/000072

§ 371 (c)(1),
(2), (4) Date: Oct. 18, 2005

(87) PCT Pub. No.: WO2004/099524

PCT Pub. Date: Nov. 18, 2004

(65) Prior Publication Data

US 2006/0272728 A1    Dec. 7, 2006

(30) Foreign Application Priority Data

Mar. 26, 2003  (NO) ................................ 20031367

(51) Int. Cl.
*F16L 9/00* (2006.01)
(52) U.S. Cl. .................... 138/157; 138/156; 138/120; 138/162; 138/163; 285/419
(58) Field of Classification Search ............. 138/156, 138/157, 162, 163, 120, 155; 52/108, 731.3; 285/419
See application file for complete search history.

(56) References Cited

U.S. PATENT DOCUMENTS

| | | | | |
|---|---|---|---|---|
| 3,360,894 A | | 1/1968 | Sharman | 52/108 |
| 3,450,186 A | * | 6/1969 | Caffa et al. | 160/241 |
| 3,491,182 A | * | 1/1970 | Eikos et al. | 264/262 |
| 3,503,164 A | | 3/1970 | Berry | 166/77.1 |
| 6,283,203 B1 | | 9/2001 | Eilertsen | 52/108 |
| 2003/0178086 A1 | * | 9/2003 | Hu | 138/156 |

FOREIGN PATENT DOCUMENTS

| | | |
|---|---|---|
| GB | 1290206 | 9/1972 |
| SE | 459267 | 6/1989 |
| WO | WO 9608671 | 3/1996 |

* cited by examiner

*Primary Examiner*—Patrick F Brinson
(74) *Attorney, Agent, or Firm*—Christian D. Abel

(57) ABSTRACT

A rigid pipe (1) is achieved according to the invention in that half-cylinder shaped elements (2) are joined/hinged (3) to each other and where to a such chains are connected together with their concave sides in a zipper-like motion. The two half-cylindrical chains are spooled (13) up individually on each side of a housing (12). This result in a particularly rigid pipe of varying length with a wide area of use.

10 Claims, 2 Drawing Sheets

HINGED AND SEGMENTED PIPE

TECHNICAL FIELD

The present invention relates to a rigid pipe comprised of hinged and segmented semi-cylindrical pipe sections that are sequentially joined together to form a rigid pipe having a long stroke-length that can be used in machines, tools, constructions or as an independent unit.

BACKGROUND ART

The prior art comprises solutions such as cylinders, telescopic cylinders, rack-and-pinion devices, threaded poles, manipulators, scissor-actuated lifts, coiled pipes, or combinations thereof.

From U.S. Pat. No. 6,283,203 is known a device for drilling oil wells. This device comprises two rack-and-pinion elements having an H-profile in a guide that among other things raises and lowers a pipe in a drilling tower.

From SE 459 267 is known an elongated cylindrical sleeve comprised of two flexible, semi-cylindrical bands that are wound on spools, and sequentially joined together to form the sleeve. This sleeve however does not form a rigid cylindrical pipe of sufficient structural integrity to be used in industrial settings.

DISCLOSURE OF THE INVENTION

The present invention provides a rigid pipe that can be formed of desired length. The pipe is comprised of two chains of semi-cylindrical pipe sections joined by hinges, that are sequentially locked together to form the rigid pipe. Because the two separate chains of pipe sections are articulated prior to being assembled, the chains may be stored on spools in a housing prior to assembly, thus achieving considerable economy of space, among other advantages that will be apparent to one skilled in the art.

Several advantages of the invention in relation to the prior art are:

- Longer stroke-length, more compact. Smaller dimensions when assembled.
- Simpler design, less expensive, faster to produce, less expensive spare parts.
- Adapted for the mounting of various tools at the end of the pipe.
- Simple drive unit that does not require large amounts of hydraulic fluid.
- Large capacity (power) and speed The invention will be described in detail with reference to the following figures, wherein, FIG. 1 shows both a perspective view of the rigid pipe and housing, and a detailed view of one embodiment the rigid pipe having threads on its outside surface.

Figure 1:
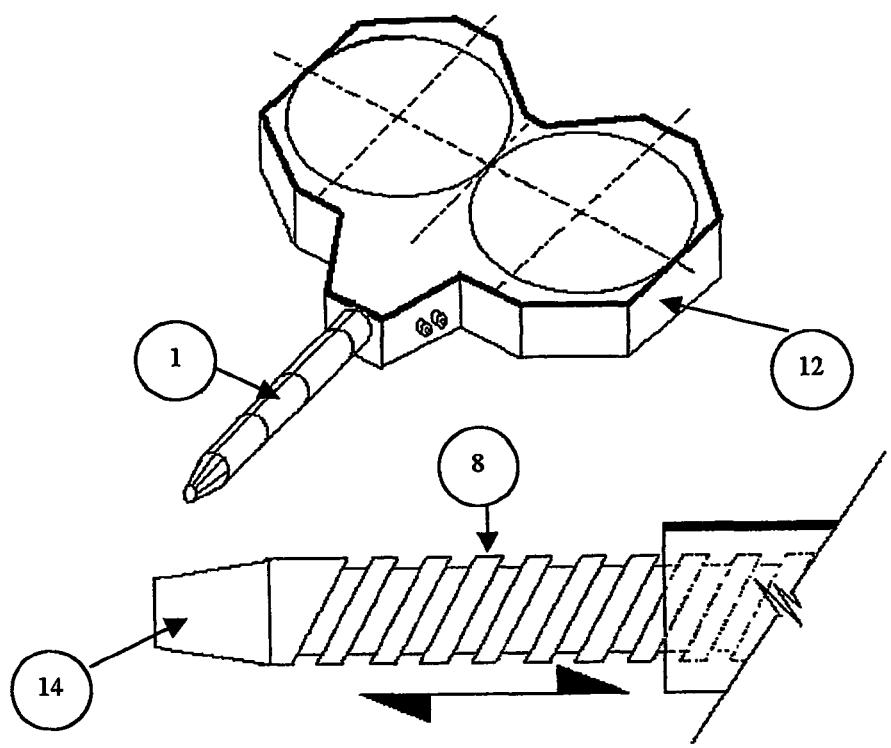
Figure 1:
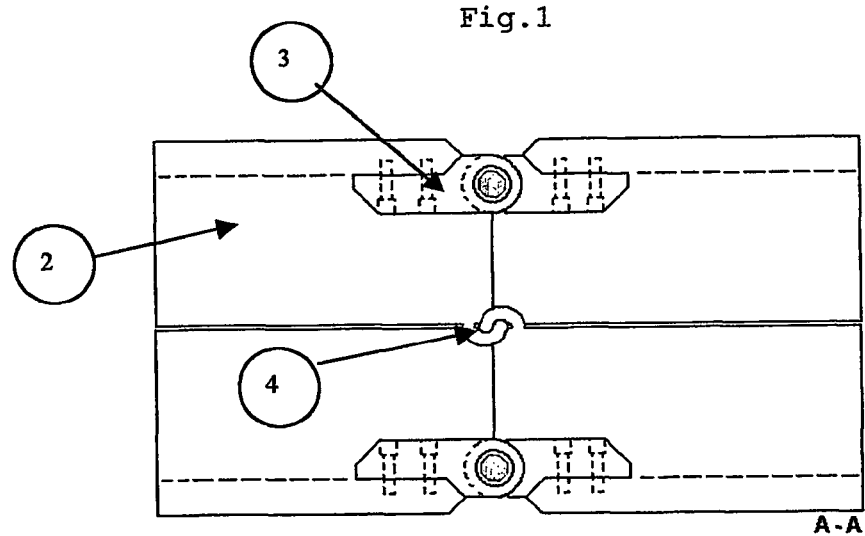
Figure 2:
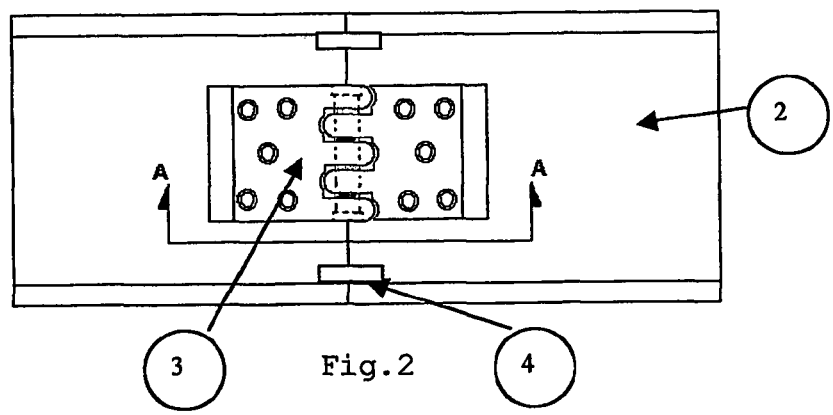
FIG. 2 shows two detailed views of the hinge and locking means
Figure 3:
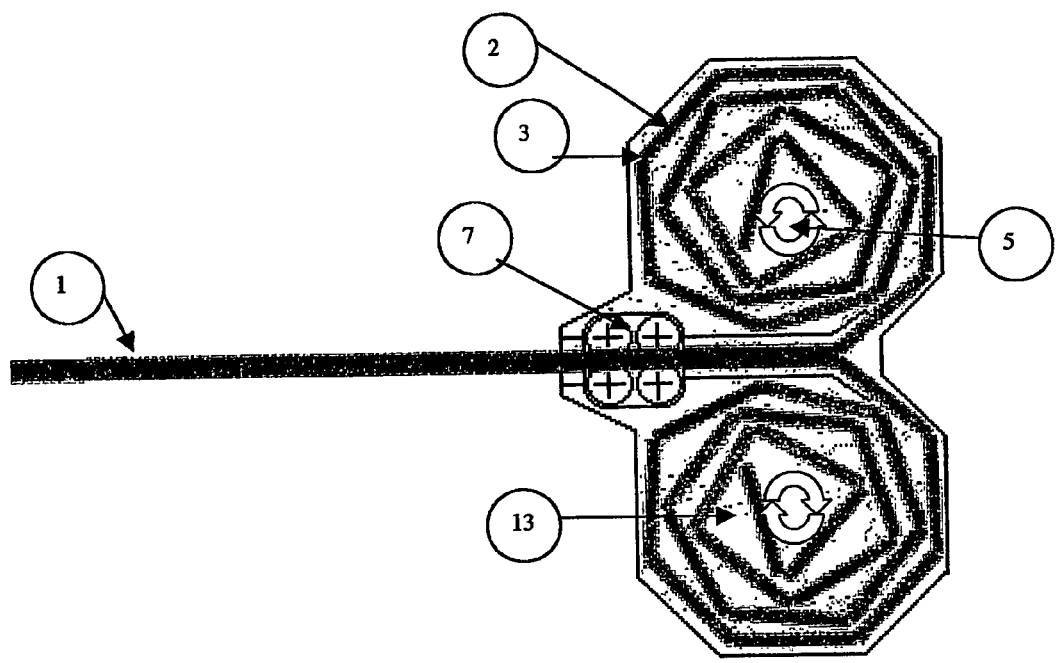
FIG. 3 shows cross sectional view of the pipe sections wound in a housing
Figure 4:
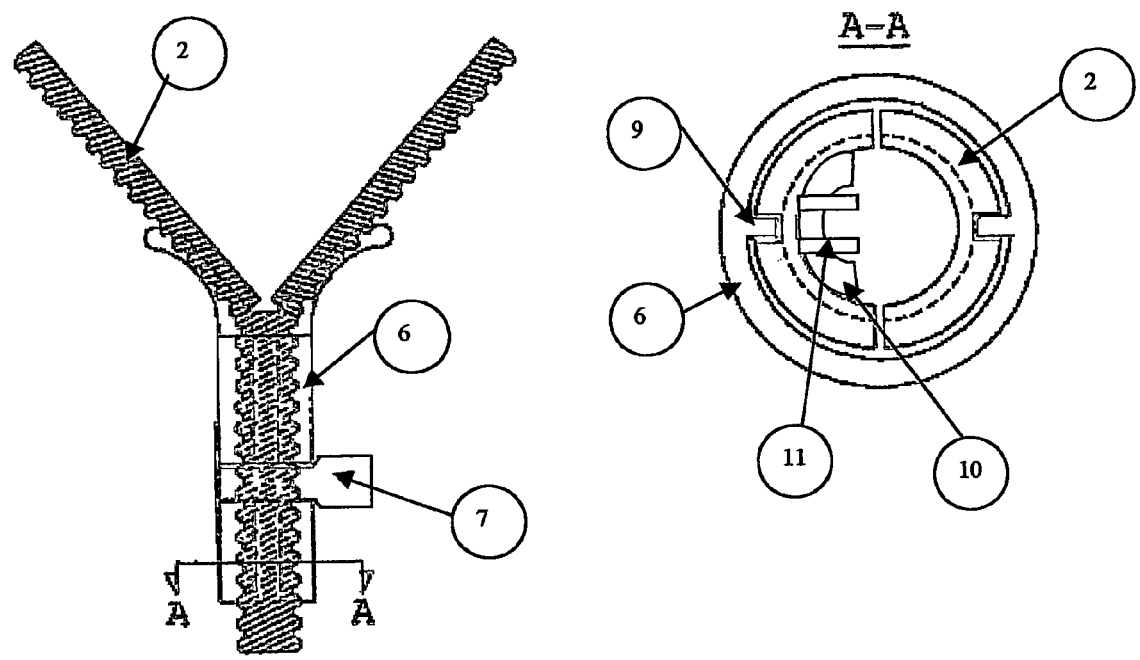

FIG. 4 detailed view of pipe sections being joined together in a guide, and a cross section of two joined pipe sections A rigid pipe of varying length (1) is achieved according to the invention in that half-cylinder shaped elements (2) are hinged (3) to each other and in that the concave sides of two of such chains are connected together in a zipper-like motion. The term "zipper-like motion" is implicitly understood to mean that opposing half-cylinder shaped elements are sequentially joined together to form a rigid pipe of desired length.

The two half-cylindrical chains are rolled up on the each side of the pipe.

In a zipper-like motion, the opposing half-cylindrical elements (2) are locked (4) to each other with the object of preventing the pipe from coming apart/becoming deformed under a load. The term "zipper-like motion" further implies that the locking means (4) from one cylindrical element (2) is complimentary to the locking means (4) from the opposing cylindrical element (2) to which it is attached.

The pipe elements are rolled (13) together in a housing (12) comprising a spool arrangement (5) and a guide (6) that leads the two halves together. In addition, the housing comprises a drive unit (7) that maneuvers the assembled pipe (1) out and in.

The drive unit (7) can function using a threaded pipe-, rack-and-pinion-, active spooling-, or friction principle. With the last-mentioned type, the elements can have a smooth surface. The drive unit will thus function in a similar manner as for a coiled pipe. In the case of a threaded pipe (8) and rack-and-pinion systems, the elements must have threads or teeth respectively. One can envision an active spool arrangement (5) that drives the pipe (1) out.

The purpose of the guide (6) is to lead the two halves together or apart from each other and to prevent rotation of the pipe.

The half-cylindrical elements (2) can be reinforced with internal cross walls (10) and longitudinal ribs (11) to increase in the mechanical strength of the connected pipe (1).

The invention claimed is:

1. A rigid pipe of variable length (1), comprising a first elongated, articulated pipe-half joined to an opposing second elongated, articulated pipe-half, said elongated pipe-halves being individually wound on spools (5) in a housing (12) and are progressively connected to each other to form a pipe (1) of desired length, characterized in that each elongated, articulated pipe-half is formed as a chain of rigid, semi-cylindrical pipe sections (2) joined together in series at their opposing ends by hinges (3), and further characterized in that each rigid pipe section (2) from the first elongated pipe-half comprises a locking means (4) that is complimentary to a locking means (4) on the opposing rigid pipe section (2) from the second elongated pipe-half, such that the complimentary locking means lock the flexible pipe-halves together with their concave side directed towards each other forming an elongated rigid pipe of desired length.

2. A rigid pipe according to claim 1, characterized in that each rigid pipe section (2) comprises internal cross-walls (10) and/or longitudinal ribs (11) for increasing the rigidity of the pipe.

3. A rigid pipe according to claim 2, characterized in that the rigid pipe sections (2) are brought into opposing alignment with each other by the help of a guide member (6), and that each rigid pipe section (2) has a groove (9) on its convex outer surface that engages a portion of guide member (6) to prevent rotation of the pipe sections.

4. A rigid pipe according to claim 3, characterized in that the rigid pipe sections are brought progressively together by the help of a drive unit (7) that actively drives the rigid pipe sections out of housing (12).

5. A rigid pipe according to claim 4, characterized in that the convex outer surface of the rigid pipe sections (2) comprises threads (6) that engage corresponding threads of drive unit (7).

6. A rigid pipe according to claim 4, characterized in that the convex outer surface of the rigid pipe sections (2) comprises teeth that engage corresponding teeth of drive unit (7).

7. A rigid pipe according to claim 4, characterized in that the convex outer surface of the rigid pipe sections (2) is smooth, and engages corresponding smooth rollers of drive unit (7) by friction.

8. A method for forming a rigid pipe (1) of variable length from two elongated, articulated pipe-halves, characterized by comprising the steps of:

forming each of the two elongated, articulated pipe-halves by connecting a plurality of rigid, semi-cylindrical pipe sections (2) together in a chain by hinged connections (3) between opposing ends of the rigid sections (2);

arranging each chain of rigid pipe sections (2) on a separate spool (5) in a housing (12) of a connection device, the connection device further comprising a guide member (6) and a drive unit (7);

bringing the elongated pipe-halves together in a progressive manner such that the concave sides of each pipe section is successively arranged facing the concave side of an opposing pipe section;

equipping each rigid pipe section (2) with a locking means (4) that is complimentary to a locking means (4) on its opposing pipe section;

Pressing the opposing pipe sections together such that they lock together; and

Continuously feeding pipe sections from the connection device until a rigid pipe of desired length is obtained.

9. The method according to claim 8, characterized in the outer convex surface of the rigid pipe sections (2) is smooth, and engages a plurality of smooth rollers of drive unit 7 by friction.

10. The method according to claim 8, characterized in the outer convex surface of the rigid pipe sections (2) has threads (6) or teeth that engages corresponding threads or teeth on a plurality of rollers of drive unit (7).

\* \* \* \* \*